United States Patent Office 3,047,410
Patented July 31, 1962

3,047,410
GLASS COMPOSITION
Edward L. Woodall, Jr., Lyndhurst, and Gerald E. Reinker, South Euclid, Ohio, assignors to General Electric Company, a corporation of New York
No Drawing. Filed Apr. 13, 1961, Ser. No. 102,671
1 Claim. (Cl. 106—53)

The present invention relates to soft glasses having high electrical resistance and suitable for use in the production of envelopes and other parts of electrical devices, such as electronic discharge tubes, electric lamps and the like.

The principal object of the invention is to provide glass having a composition such that the glass is less expensive than present high electrical resistance soft glasses and may be used in place of present glasses in the manufacture of parts for electrical devices, particularly electronic tubes.

Lithia is an expensive ingredient in glass but in spite of its relatively high cost it is used in commercial soft glasses having the high electrical resistance and other properties required in glasses of this kind, particularly in glasses used in the parts of subminiature electronic tubes having closely spaced metal conductors fusion sealed to the glass and also having components susceptible to damage by heat incident to the joining of the glass and metal parts by fusion.

We have discovered that lithia may be omitted and that only the usual inexpensive alkali oxides, sodium oxide and potassium oxide, are needed in a soft glass having the composition embodying the present invention.

In view of the long standing and extensive use of lithia by prior investigators in this field of high electrical resistance soft glasses, it was not to be expected that a glass free from lithia and possessing a softening temperature, a thermal expansion coefficient and an electrical resistivity so closely approaching these physical characteristics of lithia containing glasses could be made or that the new lithia-free glass could be substituted successfully for the more costly, lithia containing glasses in the manufacture of parts for subminiature electronic tubes, particularly.

In accordance with the invention the lithia-free glass has the following composition in weight percent as calculated from the batch:

| | | | |
|---|---|---|---|
| $PbO$ | 51.36 | $CaO$ | 0.73 |
| $SiO_2$ | 37.95 | $Na_2O$ | 0.56 |
| $K_2O$ | 6.41 | $MgO$ | 0.51 |
| $B_2O_3$ | 1.08 | $Al_2O_3$ | 0.36 |
| $BaO$ | 0.92 | $Sb_2O_3$ | 0.11 |

A comparison of the above lithia-free glass composition with a commercial, lithia containing glass and with regard to the above properties and others is the following:

| | New Glass | Lithia Containing Glass |
|---|---|---|
| Density | 3.83 | 3.994 |
| Strain Point, ° C | 413 | 406 |
| Annealing Point, ° C | 450 | 443 |
| Softening Point, ° C | 603 | 595 |
| Electrical resistivity log 10 ohm-cm. at 350° C | 9.5 | 9.4 |
| Electrical resistivity log 10 ohm-cm. at 300° C | 10.6 | 10.4 |
| Electrical resistivity log 10 ohm-cm. at 250° C | 11.7 | 11.4 |
| Coefficient of thermal expansion (0–300° C) × (10$^7$) per ° C | 88 | 88 |

It will be noted that the glass of the present invention is free from fluorine as well as lithia. It will be noted further that the glass composition has the high electrical resistance characteristic of the lithia containing glass used heretofore and that the softening temperature of the new glass, while slightly higher than the prior glass, is well within the temperature range in which glasses are designated as soft glasses in the art. Usually the upper limit of this range is considered to be approximately 650° C.

It has been found that the constituents of the new lithia-free glass as well as the relative amounts of the constituents cannot be changed without changing the desired physical characteristics of the glass. Hence, the composition of the glass as set forth above is critical in attaining the desired result of producing a lithia-free glass which may be successfully used in place of lithia containing glass in the electrical arts and particularly in the production of electron tubes having parts consisting of such glass.

It will be noted that lead oxide and silica constitute approximately 90% by weight of the glass composition with lead oxide present in greater amount than silica.

The alkali oxide content of the glass consists solely of potassium oxide and sodium oxide. The total of these two oxides in the glass amounts to approximately 7% by weight and the ratio of potassium oxide to sodium oxide is approximately 12 to 1. Thus, the other constituents constitute approximately 3 percent by weight of the glass and of this the boric oxide constitutes about one-third.

Barium oxide, calcium oxide, magnesium oxide, aluminum oxide and antimony oxide while present in small percentages by weight are all essential in the new glass for producing the unexpected advantage of eliminating from glasses of this kind the need for lithia. The elimination of lithia from the glass has resulted in a substantial decrease in the cost of such glasses without substantial change in the advantageous physical properties thereof.

The preparation of the batch, melting and forming the glass composition of the present invention are the same as for prior soft lead silicate glasses and thus are well-known in the art.

A glass batch suitable for use in producing the glass of the invention is the following in parts by weight:

| | |
|---|---|
| Litharge | 1448 |
| Sand | 1072 |
| Calcined potash | 266 |
| Boric acid | 54 |
| Sodium nitrate | 43 |
| Dolomite | 67 |
| Barium carbonate | 33.5 |
| Aluminum hydrate | 13 |
| Antimony trioxide | 3 |

The glass batch is melted by heating to a temperature of about 1400° C. under oxidizing conditions in a tank furnace for a time sufficient to form the glass.

What we claim as new and desire to secure by Letters Patent of the United States is:

A lithia-free glass having approximately the following composition in percent by weight as calculated from the batch:

| | | | |
|---|---|---|---|
| $PbO$ | 51.36 | $CaO$ | 0.73 |
| $SiO_2$ | 37.95 | $Na_2O$ | 0.56 |
| $K_2O$ | 6.41 | $MgO$ | 0.51 |
| $B_2O_3$ | 1.08 | $Al_2O_3$ | 0.36 |
| $BaO$ | 0.92 | $Sb_2O_3$ | 0.11 | said glass having a softening point of 603° C. and an electrical resistance at 350° C. of approximately 9.5 log 10 ohm-cm.

References Cited in the file of this patent

UNITED STATES PATENTS

| | | |
|---|---|---|
| 2,588,920 | Green | Mar. 11, 1952 |
| 2,736,714 | Tiede | Feb. 28, 1956 |
| 2,762,713 | Davis | Sept. 11, 1956 |
| 2,964,414 | Dalton | Dec. 13, 1960 |